United States Patent [19]
Poole

[11] Patent Number: 4,552,419
[45] Date of Patent: Nov. 12, 1985

[54] MINI-DESK

[76] Inventor: William L. Poole, 8229 Kingsbrook, #225, Houston, Tex. 77024

[21] Appl. No.: 613,231

[22] Filed: May 24, 1984

[51] Int. Cl.⁴ .................. A47B 97/00; A47B 85/00
[52] U.S. Cl. .................................... 312/281; 312/231
[58] Field of Search ............. 179/154, 146 C, 100 C, 179/100 D, 178, 149; 312/231, 233, 281

[56] References Cited

U.S. PATENT DOCUMENTS

| | | | |
|---|---|---|---|
| 388,972 | 9/1888 | Hollidge | 312/233 |
| 1,256,218 | 2/1918 | Foster | 312/233 |
| 2,007,858 | 7/1935 | Hartson | 179/149 R |
| 2,068,517 | 1/1937 | Sibbert | 179/146 R |
| 2,216,195 | 10/1940 | Hunter | 312/231 |
| 3,112,968 | 12/1963 | Cotton et al. | 179/149 |
| 3,404,930 | 10/1968 | Cafiero et al. | 312/233 |
| 4,411,482 | 10/1983 | Hoff | 312/233 |
| 4,453,788 | 6/1984 | Russell | 312/233 |

FOREIGN PATENT DOCUMENTS

| | | | |
|---|---|---|---|
| 642731 | 2/1937 | Fed. Rep. of Germany | 312/233 |
| 1946659 | 5/1971 | Fed. Rep. of Germany | 312/233 |
| 1041162 | 10/1953 | France | 179/149 |

OTHER PUBLICATIONS

"Holdaphone", *New York Times*, Sunday, Mar. 5, 1950, p. 78, Section 1.

*Primary Examiner*—Gene Z. Rubinson
*Assistant Examiner*—Danita R. Byrd
*Attorney, Agent, or Firm*—Dula, Shields & Egbert

[57] ABSTRACT

A portable mini-desk comprising a body having a generally flat surface thereabout, a first surface connected to the body and capable of canting with respect to that body, and controls arranged about the body so as to maintain the first surface in at least one fixed position. A turntable is interposed between the first surface and the body. The turntable has a generally circular shape. The body has a generally planar base, a plurality of vertical walls extending from the base, an upper surface generally parallel to the base, and an inclined surface extending from the upper surface. The controller is made up of a first geared member connected to the first surface, a second geared member disposed adjacent to the first geared member, an arm connected to the second geared member, and a lever connected to the arm. A spring is incorporated into the body so as to properly bias the arm. A telephone holder is cantably positioned about the body. This telephone holder comprises a socket, a ball received by the socket, an elongate member fastened to the ball and extending from the socket, and an enclosure for holding a telephone.

10 Claims, 7 Drawing Figures

MINI-DESK

TECHNICAL FIELD

The present invention generally relates to furniture. More particularly, the present invention relates to desks useful in the office environment. The present invention also relates to portable desks having telephone mounting devices.

BACKGROUND ART

A desk is a piece of furniture designed for reading or writing. Many desks of all periods have had a sloping top to support reading or writing material. In Byzantine times a combination desk and lectern was used that consisted of a flat-topped cupboard from which rose a lectern on a stand. An early desk, used in the Middle Ages, was called a writing box. It stood on a table and, because it could be moved easily, it was sometimes taken on journeys. Some writing boxes were fitted with drawers and letter holes. Most lids were hinged either at the front or back, those hinged at the front often supported in a horizontal position by slides that could be pulled out of the framework, by hinged stays fixed inside the lid, or by a combination of both.

A great variety of desks were made in the 18th century, particularly in France, where the habit of writing little notes became something of a social mania. Many desks contained ingenious mechanical devices. In the Musee des Arts Decoratifs in Paris, for example, there is a flat desk with a top that folds forward while a tier of drawers rises at the back. Two similar types, in use in mid-18th century, are the cylinder top and the roll top desks. The cylinder top was a rigid, quater-circle shutter covering the interior. The top could be slid back into the body of the desk while, at the same time, a writing surface might drawn forward. The roll top desk had a similar curved section, but it was made from strips of wood glued horizontally to a sheet of veneer. When the desk was opened, the strips were wrapped around a cylinder in the back. In England the kneehole desk was developed in the early 18th century. Its top was supported by two banks of cupboards, or drawers, separated by a space for the legs of the person seated at the desk. Larger versions, known as library tables, or sometimes, partners' desks, were created for two people, who sat facing each other.

In the modern office environment, there has become the need for incorporating the proper use of a phone into the desk environment. In achieving maximum efficiency in the office, it is often times necessary for the phone to be separated from the hands of the person at the desk. Two prior patents have discussed the use of a desk that incorporates a phone. U.S. Pat. No. 2,007,858, issued to R. L. Hartson disclosed an enclosure that normally retains a telephone in an inoperative position. When the access door is opened, however, the telephone receiver may be positioned in a stand so that the person using the telephone may have both hands free for other operations. U.S. Pat. No. 2,068,517, issued to Sibbert, discloses a desk that employs a rail and roller arrangement so that the top telephone headseat may be drawn toward a person sitting at the desk in an expeditious manner.

It is an object of the present invention to provide a portable mini-desk that allows convenient access to a telephone receiver while maintaining a person's ability to write with both hands.

It is another object of the present invention to provide a portable mini-desk that is convenient and maximizes ergonomic efficiency.

It is another object of the present invention to provide a portable mini-desk that minimizes back strain.

It is still another object of the present invention to provide a portable mini-desk that is adaptable for use in conjunction with computer equipment and other modern office furnishings.

These and other objects and advantages of the present invention will become apparent from a reading of the attached specification and appended claims.

DISCLOSURE OF THE INVENTION

The present invention is a portable mini-desk comprising a body having a generally flat surface thereabout; a first surface connected to the body; and a controller arranged about the body so as to maintain the first surface in at least one fixed position with respect to the body. The first surface is capable of canting with respect to the body. A turntable is interposed between the first surface and the body. The first surface is connected to the turntable so as to permit rotational movement of the first surface with respect to the body. The turntable is pivotally attached to the body. A stop is attached about the turntable and the first surface so as to limit the rotational movement of the first surface to a 90° arc. A brake is also arranged about the turntable for releasably affixing the first surface in a position relative to the body. This brake comprises a thumbwheel, a threaded shaft, and a pair of friction-causing brake members threadedly attached to the shaft. These brake members have opposing threads such that the turn of the thumbwheel will cause the brake members to contract or retract along the threaded shaft.

The body of the present invention comprises a generally planar base, a plurality of vertical walls extending upward from the base, an upper surface generally parallel to the base and extending perpendicular to at least a portion of the vertical walls, and an inclined surface extending from the upper surface about at least a portion of the walls. The planar base has a padded section removably fastened thereto.

The first surface is movable between a first and second position. The first position is parallel to the base. The second position is generally parallel to the inclined surface of the body. The controller affixes the first surface in either of these positions. The controller of the present invention comprises a first geared member connected to the first surface. The plane of the first geared member is arranged generally perpendicular to the first surface. A second geared member is disposed generally adjacent to the first geared member. This second geared member has teeth that are capable of meshing with the teeth of the first geared member. An arm is connected to the second geared member and positioned within the body. A lever is connected to the arm so as to cause the arm to move longitudinally within the body. A biasing member is connected to the arm so as to maintain the second geared member generally adjacent to the first geared member.

A telephone positioning device is cantably positioned and connected to the body. The telephone positioner comprises a socket arranged about a cavity in the body, a ball received by the socket, an elongate member fastened to the ball and extending from the socket, and a telephone attachment enclosure connected to the elongate member for receiving a telephone receiver. The socket comprises an enclosure removably positioned within the cavity of the body, a first bracket fastened within the enclosure, a second bracket positioned about the top surface of the enclosure, and an adjustment thumbwheel arranged about the first and second brackets for adjusting the friction between the first and second brackets and the ball. The elongate member has a geared rack extending longitudinally thereabout. The telephone attachment device is connected to the geared rack and movable thereon by way of a spur gear rotatably mounted about a strip extending from the telephone attachment device.

BEST MODE FOR CARRYING OUT THE INVENTION

Figure 1:
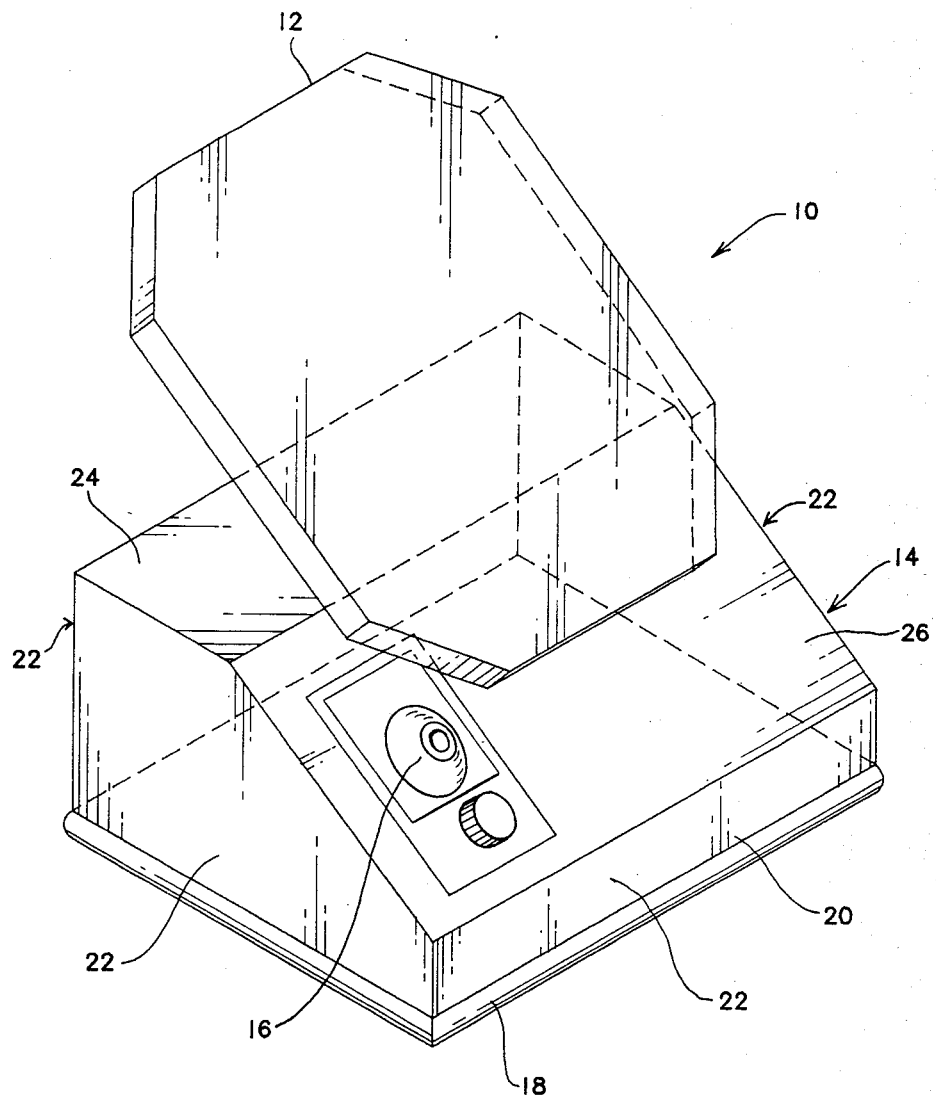
FIG. 1 is a perspective view of the mini-desk in accordance with the present invention.

Referring to FIG. 1, there is shown the mini-desk 10 of the present invention in accordance with its preferred embodiment. As can be seen in FIG. 1, mini-desk 10 is shown with its first surface 12, body 14, and telephone attachment receptacle 16.

First surface 12 is a generally flat surface having an octagonal shape. FIG. 1 shows the arrangement of the present invention in which this first surface 12 is tilted upwardly and facing the user of the mini-desk. The apparatus for attaching first surface 12 to body 14 is described hereinafter.

Body 14 is essentially a molded plastic material. This body 14 has a flat base 18. Flat base 18 may be made of a solid plastic material or may be a padded surface. In any case, flat surface 18 should be suitable for placing on the lap of the user. Still alternatively, flat surface 18 could be a padded surface with snap attachments to the flat plastic base surface 20 of body 14. Walls 22 extend vertically from base 18. These walls 22 form the outer surfaces of the mini-desk 10. An upper surface 24 is generally parallel to the base 18 and extends perpendicular from at least a portion of the vertical walls 22. An inclined surface 26 extends from this upper surface to the wall 22 nearest the user of the mini-desk. This inclined surface may be used for writing or for other purposes.

Telephone attachment receptacle 16 is located on the side of inclined surface 26. Telephone attachment receptacle 16 is more clearly described in conjunction with the description of FIG. 5.

Figure 2:
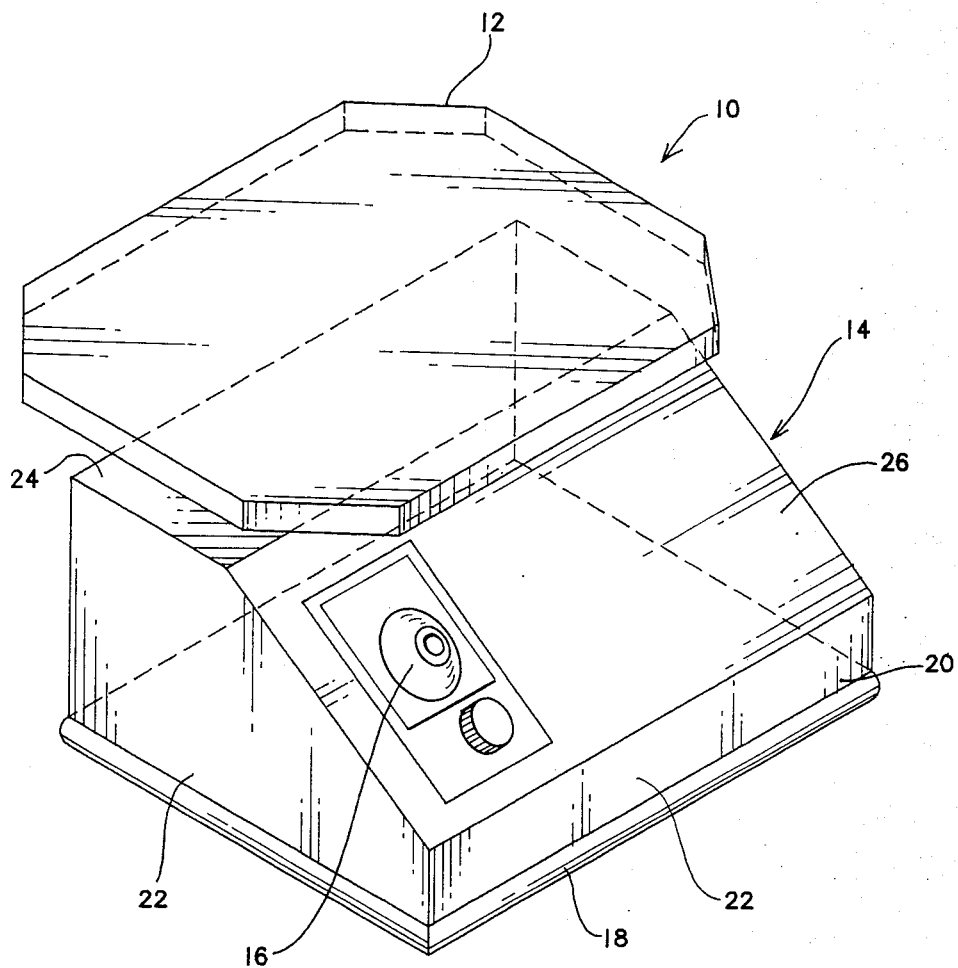
FIG. 2 is a perspective view of the mini-desk of the present invention showing the first surface in an alternative position.

FIG. 2 is a perspective view of the mini-desk 10 of FIG. 1. However, in the embodiment of FIG. 2, the first surface 12 is turned so that its longitudinal axis is perpendicular to the user of the desk. Furthermore, the first surface 12 is positioned so as to be generally parallel with upper surface 24 of body 14.

Figure 3:
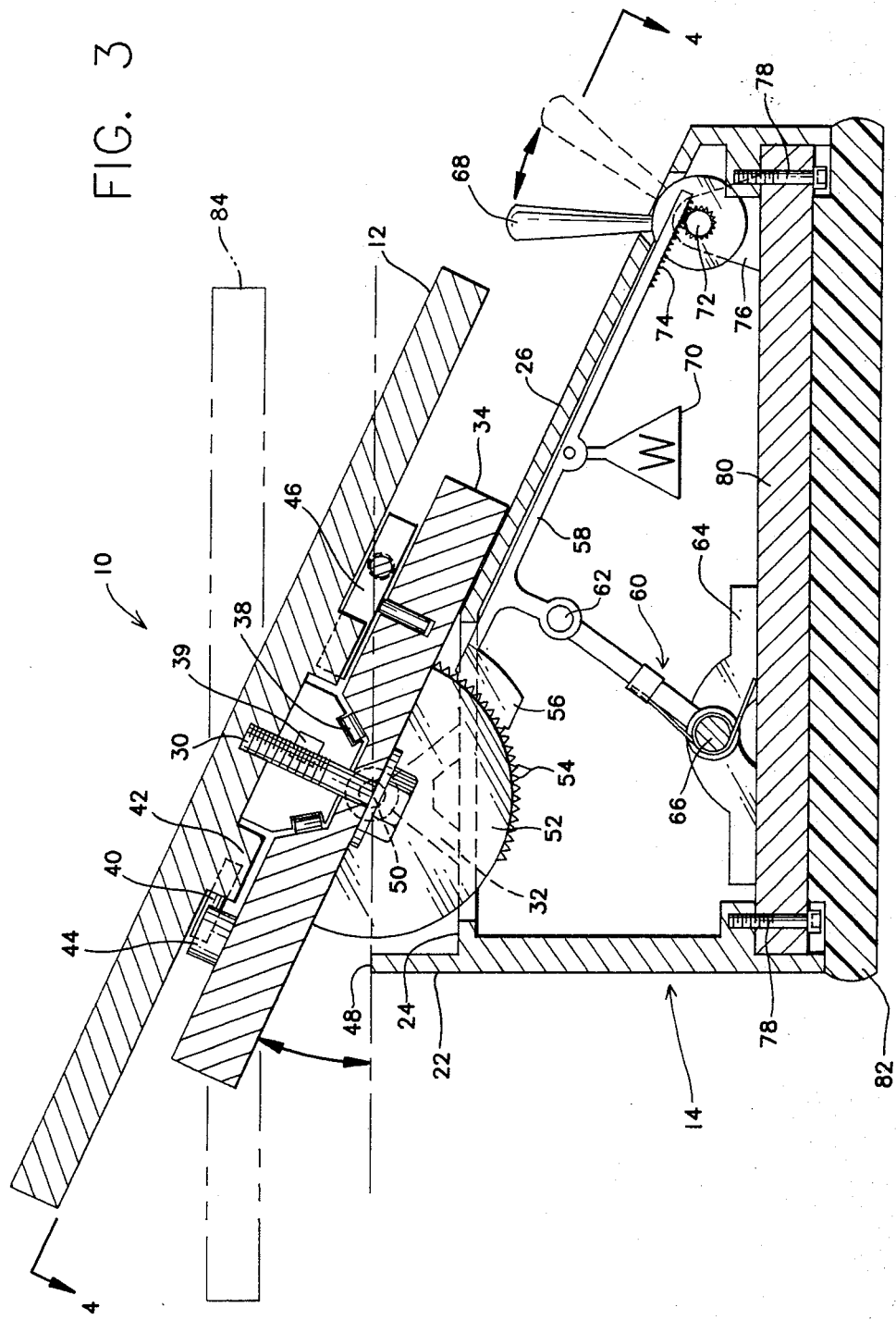
FIG. 3 is a cross-sectional view in side elevation of the mini-desk of the present invention.

FIG. 3 is a cross-sectional representation of the mini-desk 10 as shown in FIG. 1. In the arrangement of FIG. 3, first surface 12 is positioned so as to be generally parallel with the inclined surface 26. First surface 12 is connected to body 14 through pin 30. Pin 30 is generally attached to the center of first surface 12 and extends downwardly to support structure 32. The arrangement of components between first surface 12 and turntable 34 allows first surface 12 to rotate with respect to the body 14. Roller bearings 38 are mechanically keyed to pin 30 so as to provide this rotational movement. Key 39 affixes pin 30 to roller bearings 38. Pin 30 has a grooved keyway which accepts key 39. Roller bearings 38 also have a matching grooved keyway which accepts key 39. Roller bearings 38 are positioned within a cavity of turntable 34. In this arrangement, first surface 12 will rotate freely within roller bearings 38. Stops 40 are fastened to the outer edges of substructure 32. Stops 40 restrict the movement of first surface 12 to a 90° arc. Stops 40 will limit this movement whenever they encounter abutment 44. Brakes 46 are provided and arranged about turntable 34 so as to affix first surface 12 in a position desired. A more complete illustration and description of the stops 40 and brakes 46 are provided in conjunction with the description of FIG. 4. Turntable 34 is arranged such that it is generally parallel to the first surface 12. Turntable 34 will abut the inclined surface 26 when first surface 12 is in one position. When in another position, turntable 34 will abut the top 48 of wall 22. It is the abutting relationship of turntable 34 with the surfaces that provides the limits on the pivotal rotation of first surface 12 about shaft 50. Shaft 50 includes stud bolt fasteners having an inset end of a phillips-head or hexagon design. These stud bolts are threadedly attached to turntable 34, with a smooth surface extension through bearing support structure 32. The smooth surface portion of the length of the stud bolts of shaft 50 will have a diameter slightly larger than the threaded portion. A first geared member 52 is attached to the bottom of turntable 34. First geared member 52 extends in a plane generally perpendicular to the plane of first surface 12. Geared member 52 has a plurality of teeth 54 extending along its outer diameter. Support structure 32 permits the generally rotational movement of first geared member 52 about pivot point 50. Support member 32 is affixed to upper surface 24 of body 14.

A second geared member 56 is located in generally close proximity to the teeth 54 of first geared member 52. Second geared member 56 is a portion of a gear having teeth that mate with and match the teeth 54. Second geared member 56 is connected to arm 58. Arm 58 is pivotally connected to a spring mechanism 60 about pivot point 62. Spring 60 is a tensioner type spring that maintains arm 58 and second geared member 56 in their proper position in relation to first geared member 52. Spring 60 is mounted within body 14 about a fastener 64. Fastener 64 also has a pivot point 66 that permits the rotational movement of spring 60 under pressure from arm 58 or lever 68. Arm 58 extends from second geared member 56 to lever 68. A weight 70 is provided about the midpoint of arm 58 so as to maintain arm 58 in its proper position in relation to the pinion 72 of lever 68. As can be seen in FIG. 3, arm 58 includes a rack 74 about its lower end adjacent lever 68. Also, lever 68 is movable between a first position as indicated by the solid drawing of FIG. 3 to a second position as indicated by the dotted drawing in FIG. 3. The movement of this lever 68 causes arm 58 and associated second geared member 56 to move either toward first geared member 52 or away from first geared member 52. Spring 60 provides sufficient forces so as to maintain second geared member 56 in meshing relationship with the teeth 54 of first geared member 52. Lever 68 is pivotally mounted to a bracket 76. As will be seen in later drawings, pinion 72 extends longitudinally from the pivot point of lever 68.

Fasteners 78 affix the base 80 in its proper position about body 14. As seen in FIG. 3, a padded base 82 may also be attached to base 80 so as to enhance comfort for the user of the mini-desk.

FIG. 3 shows the mini-desk 10 of the present invention in its position with first surface 12 resting generally parallel to inclined surface 26. The purpose of the present invention is to enhance the ability to adapt to the writing requirements and needs of the user of the mini-desk 10. This may be accomplished by both the rotational movement of first surface 12 and the angular movement of first surface 12. As shown in FIG. 3, first surface 12 is capable of moving into the position 84 generally parallel with upper surface 24. Such movement is accomplished by releasing second geared member 56 from the meshing relationship with the teeth 54 of first geared member 52. This releasing can be accomplished by moving lever 68 into its alternative position. When the second geared member 56 is released from first geared member 54, the first surface 12 may be moved to the alternative position 84. However, the present invention also makes the first surface 12 available for use in any position therebetween. As a result, the present invention adapts itself to the angle of writing of the user. Also, as described hereinafter, first surface 12 may be rotated about axis 30 as needed.

Figure 4:
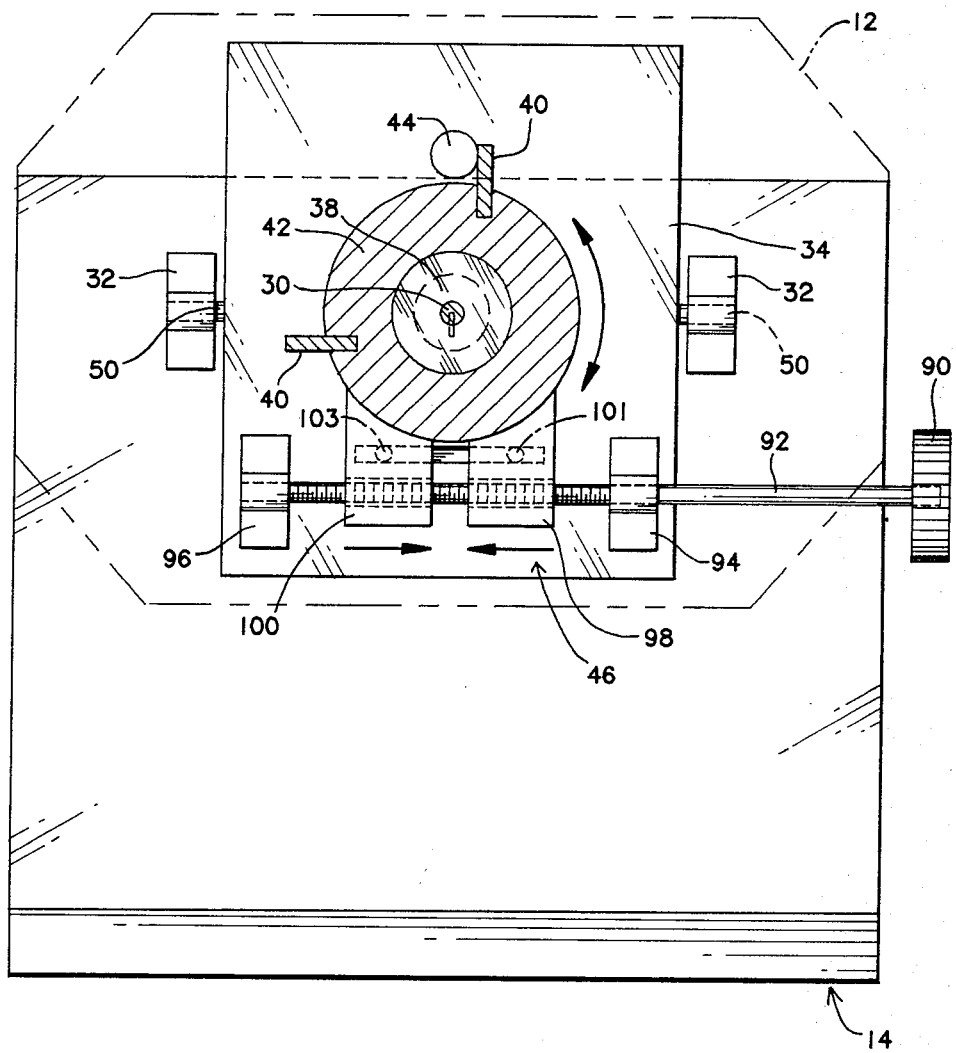
FIG. 4 is a cross-sectional top view taken across lines 4—4 of FIG. 3.

FIG. 4 specifically illustrates the turntable 34 of the present invention. Turntable 34 has the annular section 42 of first surface 12 rotating thereabout. Attachment member 30 is fastened to first surface 12 about its center area. Suitable roller bearings 38 are provided so as to assist in the easy rotation of surface 12 with respect to turntable 34.

As can be seen in FIG. 4, first surface 12 can be rotated in either direction, as shown by the arrows on annular surface 42. Stops 40 are attached to the annular surface 42 at locations generally 90° apart. Stops 40 serve to limit the rotational movement of first surface 12. Stops 40 rotate until they encounter a surface of abutment member 44.

Turntable 34 is retained in proper position by support member 32. Support members 32 include suitable bearings for the receipt of stud fasteners 50 extending therethrough. The interaction of stud fasteners 50 with the rotation causing ability of turntable 34 allows first surface 12 its movement throughout its before-indicated positions.

Since it is desirable to allow first surface 12 to rotate and be releasably affixed in any position within its 90° arc of rotation, a brake 46 is provided. Brake 46 includes a thumbwheel 90 that extends beyond the body 14 of the mini-desk 10 of the present invention. A thumbwheel 90 is affixed to the end of a threaded shaft 92. Threaded shaft 92 extends through turntable 34. Threaded shaft 92 is received and maintained in its longitudinal position by bearing members 94 and 96. Bearing members 94 and 96 allow threaded shaft 92 to rotate without changing the longitudinal position of the theaded shaft. Brake members 98 and 100 are threadedly attached to threaded shaft 92. The threads of brake members 98 and 100 are such that they will move toward each other or away from each other upon the rotation of thumbwheel 90. Brake members 98 and 100 include stud pieces 101 and 103, respectively. Smooth-surfaced stud pieces 101 and 103 extend downward into turntable 34 along a guide track (not shown) inset in piece 34. Stud pieces 101 and 103 provide an anti-rotation action for brake members 98 and 100 when torque is applied to thumbwheel 90. In operation, when brake members 98 and 100 are spread away from each other, the first surface 12 is free to rotate about its axis 30. On the other hand, when brake members 98 and 100 are drawn adjacent to each other, a braking action occurs. This braking action occurs by the friction between the annular section 42 and the upper, curved portion of brake members 98 and 100. In this manner, first surface 12 can be manipulated so as to be in a proper position for writing or other usage.

Figure 5:
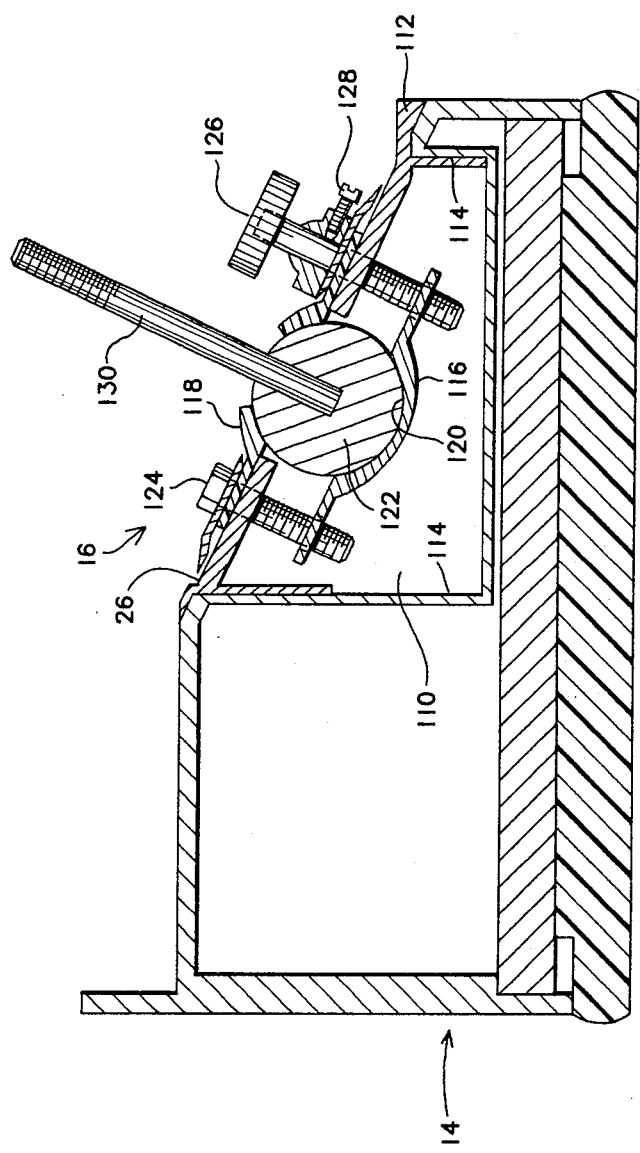
FIG. 5 is a cross-sectional view in side elevation of the ball-and-socket arrangement within the body of the present invention.

FIG. 5 shows a cross-sectional view of the telephone attachment receptacle 16 of the present invention. This receptacle 16 is defined by a cavity 110 in body 14. Cavity 110 occurs in the inclined surface 26. The cavity 110 appears as a generally rectangular opening in a portion of inclined surface 26.

The telephone attachment receptacle 16 is designed so as to fit within cavity 110. Enclosure 112 is designed so as to slide along the inner walls 114 of inner cavity 110. This sliding-type of engagement should secure the enclosure 112 within the cavity. The telephone attachment receptacle 16 has a first bracket 116 fastened within enclosure 112. This first bracket has a curved area 120 adapted for receipt of a portion of a ball joint 122. Second bracket 118 is positioned about the top surface of enclosure 112 and has a curved area for fitting against a portion of the surface of ball 122. Second bracket 118 is ideally made of a suitable elastomeric material. Each of these brackets 116 and 118 is fixed to the enclosure 112 by guide members 124 and 126. Guide member 124 is designed so as to secure the first bracket 116 and the second bracket 118 in proper position and relation to each other. The guide member 126 is a type of thumbwheel which may be manually tightened so as to secure ball 122 in the area formed by brackets 116 and 118. A set screw 128 is provided with guide member 126 so as to secure the position of guide member 126. The materials of brackets 116 and 118 and ball 122 should have a high coefficient of friction therebetween. A high coefficient of friction will assist the purpose of maintaining the ball in its proper position. An elongate member 130 is rigidly affixed to and within ball 122. Elongate member 130 extends from ball 122, through an opening in bracket 118 and outward. It is this combination of elements that provides the unique advantage of the telephone positioner of the present invention.

Figure 6:
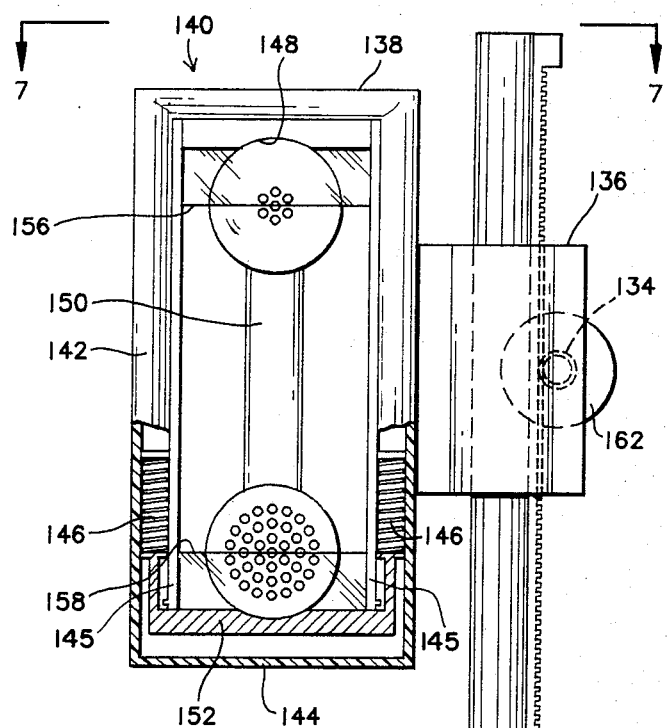
FIG. 6 is an elevational view of the telephone attachment device in accordance with the present invention. The telephone attachment device is shown as separate from the desk portion.
Figure 7:
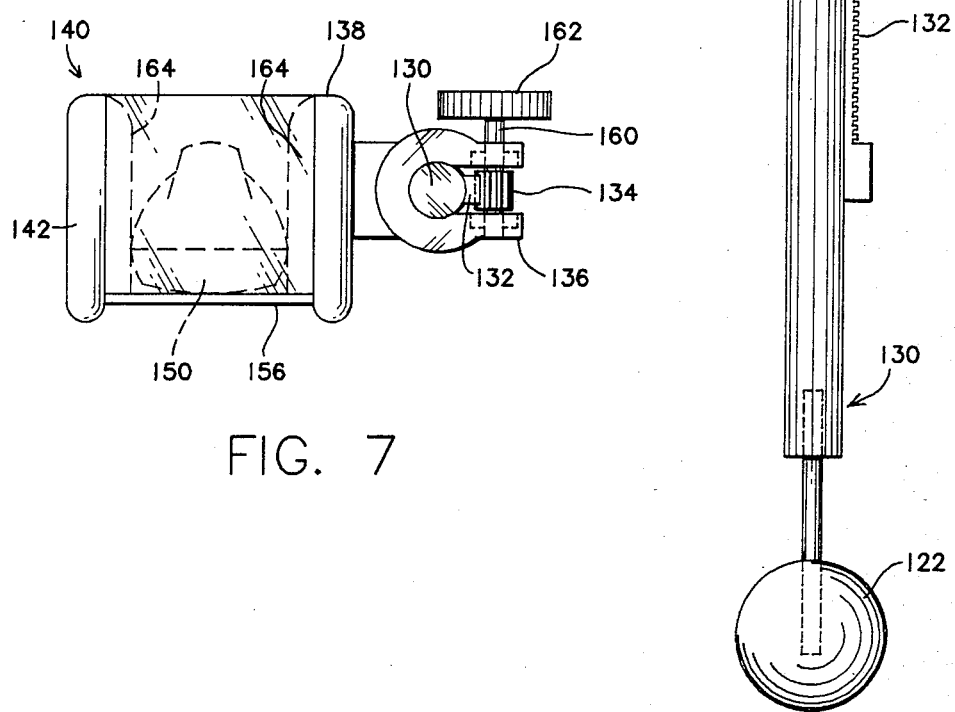
FIG. 7 is a top view of the telephone attachment device, as taken across lines 7—7 of FIG. 6, in accordance with the present invention.

FIGS. 5–7 illustrate the arrangement and configuration of the telephone positioner at the present invention. FIG. 5 shows the manner in which the telephone positioner is connected in a ball-and-socket fashion to the desk portion of the present invention. FIG. 6 is the frontal view of the telephone positioner as shown separate from the desk portion. The telephone positioner extends from the desk portion, when connected, in an infinitely variable arrangement of angles and planes. FIG. 7 is a top view of the telephone positioner, as shown separate from the desk portion.

FIG. 6 is a more detailed view of the telephone positioner 140 of the present invention. As can be seen in FIG. 6, telephone positioner 140 extends from ball 122 and attaches to elongate member 130. Ball 122 of FIG. 6 is the same element as ball 122 as shown in FIG. 5. Relative to FIG. 1, the telephone positioner 140 is cantably mounted to the desk portion by the emplacement of ball 122 into the telephone attachment receptacle 16. Elongate member 130 extends upwardly from the ball 122 and the desk portion. The movement of ball 122 within receptacle 16 and the positioning of elongate member 130 in correspondence thereto will serve to locate the telephone in a position adjacent to the desk-user's ear. Elongate member 130 includes a geared rack 132 affixed longitudinally thereto. The gear rack 132 provides the path that the telephone positioner 140 may travel so as to adapt to the needs of the phone-user and mini-desk-user.

Telephone positioner 140 is fastened to geared rack 132 and elongate member 130 by way of spur gear 134. Spur gear 134 is mounted within a strut 136 that extends from the telephone positioner 140 around and about the elongate member 130. A better view of this engagement is shown in FIG. 7. Strut 136 is rigidly affixed to the telephone holder 138.

Telephone holder 138 is comprised of a solid rectangular bracket 142 incorporating piece 144. Moveable bracket 152 is internal of the structure formed by bracket 142 and piece 144. Moveable bracket 152 abuts the internal finger arms 145 of bracket 142. Simply stated, the telephone holder 138 is a spring-loaded cartridge that retains the telephone in position. Moveable bracket 152 is attached to bracket 142 via springs 146. These springs 146 provide an elastic-type of interconnection between the brackets of the telephone holder 138. For the comfort of the user of the telephone, bracket 142 is covered by a cushion type of material. Bracket 142 has a small curved indentation 148 that receives the upper part of telephone receiver 150. The springs 146 allow each of the brackets to suitably adapt for various sizes and types of telephones. A retaining element 156 is provided across bracket 142 so as to secure the telephone within the telephone holder. Similarly, a lower retaining element 158 extends across piece 144. Each of these elements cooperate so as to provide the telephone in a secured position. The telephone receiver 150 is easily loaded into the telephone holder 140. Specifically, the earpiece of the telephone slides under retaining element 156 into position against curved indentation 148. The mouthpiece slides into the spring-loaded bracket 152 beneath lower retaining element 158. Since the spring-loaded bracket 152 is movable between a position abutting internal finger arms 145 and a position abutting against the piece 144, the telephone holder should be adaptable for a wide variety of telephone receiver sizes and shapes.

FIG. 7 shows a top view of the telephone positioner 140. As can be seen in this view, spur gear 134 engages the teeth of gear rack 132. Spur gear 134 is fastened to a rod 160. Rod 160 connects the thumbwheel 162 with the spur gear 134. Spur gear 134 engages the teeth of geared rack 132. Geared rack 132 is fastened to or formed as part of the elongate member 130. This rod extends through the strut 136 and attaches to a thumbwheel 162. Any rotation of the thumbwheel 162 will result in a movement of the telephone positioner 140 along the geared rack 132 of elongate member 130. The telephone positioner 140 can thus be moved and positioned to a desired location along the length of the elongate member 130. As used herein, the interaction of the mechanism of the telephone positioner 140 and the geared rack 132 is virtually identical to the mechanism used on overhead projectors. The mechanics of maintaining the telephone positioner at a desired position along elongate member 130 is well known in the prior art. Strut 136 extends around elongate member 130 to the telephone holder 138. Bracket 142 is shown with cushioned surfaces. Retaining member 156 extends across the front portion of holder 138. Guide surfaces 164 are adjacent bracket 142 so as to properly position telephone 150.

The present invention provides a mini-desk with many of the features required for the modern office. The mini-desk allows for the busy executive to listen to his phone while easily writing on the surfaces, either inclined or planar. This arrangement of components eliminates many of the back problems encountered by the continual bending and leaning that is required for use of regular types of desks. In addition, the mini-desk is particularly adaptable to lap usage. The mini-desk may be rested on a person's lap while writing occurs or telephone listening occurs. The unique connectors between the desk and the telephone allow the telephone to be placed in a variety of positions. The rotation and inclination ability of the first surface enables the writing surface to be tilted to the proper writing angle of the user of the mini-desk. There are, of course, many other uses of the mini-desk. It can be used in airplanes, onboard ships, or in many other locations. Since the telephone attachment is removable from the body of the desk, the mini-desk may be used by itself or in conjunction with the telephone. This is solely at the option of the user.

The foregoing disclosure and description of the invention is illustrative and explanatory thereof, and various changes in the size, shape, and materials, as well as in the details of the illustrated construction, may be made within the scope of the appended claims without departing from the spirit of the invention. This invention should only be limited by the appended claims and their legal equivalents.

I claim:

1. A portable desk comprising:
   a body having a generally flat surface thereabout;
   a first surface connected to said body, said first surface capable of canting with respect to said body;
   control means arranged about said body so as to maintain said first surface in at least one fixed position with respect to said body; and
   a turntable means interposed between said first surface and said body, said first surface connected to said turntable means so as to permit rotational movement of said first surface with respect to said body, said turntable means being pivotally attached about said body.

2. The portable desk of claim 1 further comprising:
   stop means attached about said turntable means and said first surface, said stop means for limiting the rotational movement of said first surface to a 90° C. arc.

3. The portable desk of claim 1 further comprising brake means attached to said turntable means for releasably affixing said first surface in a position relative to said body.

4. The portable desk of claim 3, said brake means comprising:
   a thumbwheel;
   a threaded shaft connected to said thumbwheel; and
   a pair of brake members threadedly attached to said shaft, said brake members having opposing threads, said brake members including a frictional surface arranged adjacent to the outer surface of said turntable means.

5. The portable desk of claim 4, said turntable means having a generally circular shape, said frictional surface of said brake members having a shape complementary of said circular shape of said turntable means.

6. A portable desk comprising:
   a body having a generally flat surface thereabout;
   a first surface connected to said body, said first surface capable of canting with respect to said body; and
   control means arranged about said body so as to maintain said first surface in at least one fixed position with respect to said body, said control means comprising:
      a first geared member having teeth, said first geared member connected to said first surface, the plane of said first geared member being arranged generally perpendicular to said first surface, said first geared member movable relative to the motion of said first surface;
      a second geared member disposed generally adjacent said first geared member; said second geared member having teeth capable of meshing with the teeth of said first geared member;
      an arm connected to said second geared member and positioned within said body; and
      lever means connected to said arm, said lever means interactive with said arm so as to cause said arm to move longitudinally 7. The portable desk of claim 6, said lever means movable between a first position and a second position, said first position causing said teeth of said second geared member to mesh with the teeth of said first geared member, said second position causing the separation of said second geared member from said first geared member.

8. The portable desk of claim 6, further comprising:
   biasing means connected to said arm, said biasing means arranged within said body for positioning said second geared member generally adjacent said first geared member.

9. The portable desk of claim 6, said lever means comprising:
   a lever extending from within said body to a location exterior of said body;
   a pinion fastened about the pivotal axis of said lever within said body, said arm including a rack about the end adjacent said lever, said rack arranged so as to mesh with said pinion; and
   retention means so as to maintain said rack in juxtaposition with said pinion.

10. A portable desk comprising:
   a body having a generally flat surface thereabout, said body comprising:
      a generally planar base;
      a plurality of vertical walls extending upward from said base;
      an upper surface being generally parallel to said base and extending perpendicular from at least a portion of said vertical walls; and
      an inclined surface extending from said upper surface and connected about at least a portion of said walls, said upper surface having a pivot means mounted thereabout, said pivot causing said first surface to move between said first position and said second position, said pivot means comprising:
         a support member fastened to said upper surface of said body;
         a shaft received by said support member, said shaft rotatable relative to said support member; and
         an attachment member fastened to said first surface and said shaft;
   a first surface connected to said body, said first surface capable of canting with respect to said body, said first surface movable between a first and second position, said first position being parallel to said base, said second position being generally parallel to said inclined surface, said control means affixing said first surface in either of said positions; and
   control means arranged about said body so as to maintain said first surface in at least one fixed position with respect to said body.

* * * * *